Feb. 6, 1951 E. F. CORNOCK ET AL 2,540,430
GUM WRAPPING MACHINE
Filed July 17, 1948 13 Sheets-Sheet 11
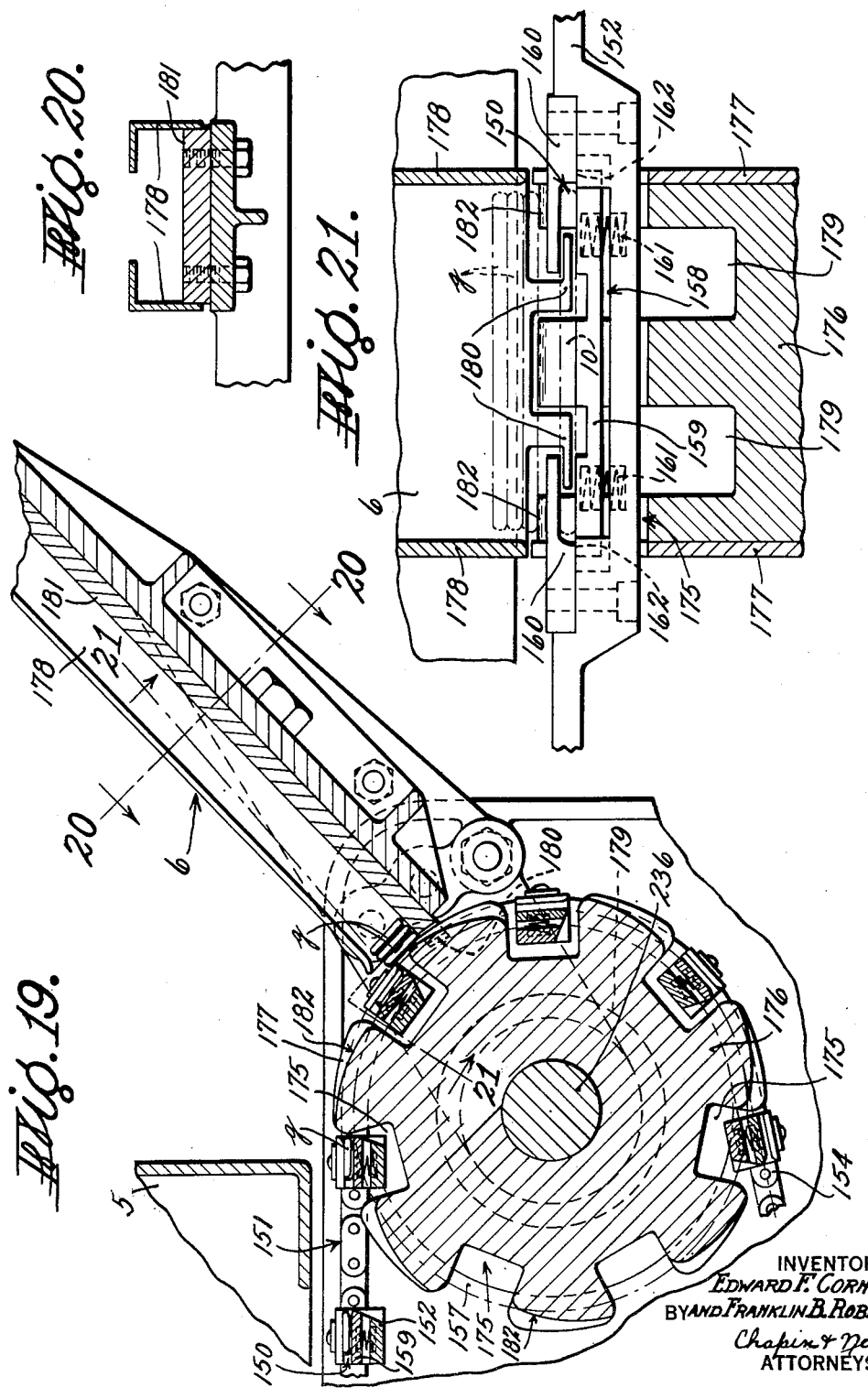
INVENTORS
*Edward F. Cornock*
BY AND *Franklin B. Roberts*
*Chapin & Neal*
ATTORNEYS Feb. 6, 1951 E. F. CORNOCK ET AL 2,540,430
GUM WRAPPING MACHINE
Filed July 17, 1948 13 Sheets—Sheet 12
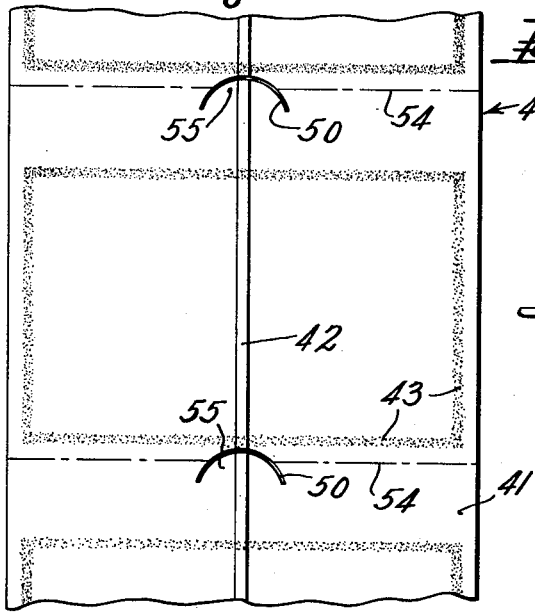
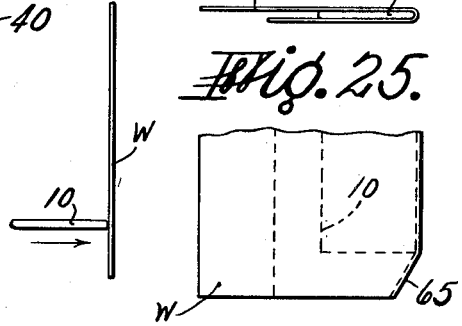
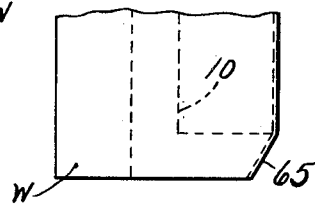
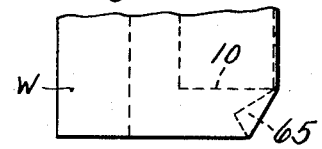
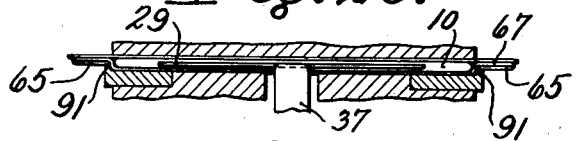
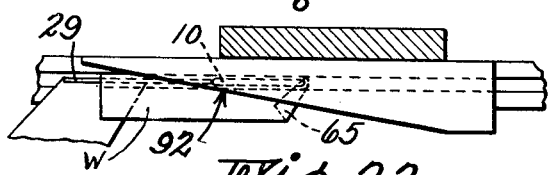
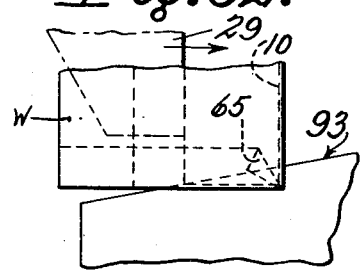
INVENTORS
EDWARD F. CORNOCK AND
FRANKLIN B. ROBERTS
BY Chapin & Neal
ATTORNEYS Feb. 6, 1951 E. F. CORNOCK ET AL 2,540,430
GUM WRAPPING MACHINE
Filed July 17, 1948 13 Sheets-Sheet 13
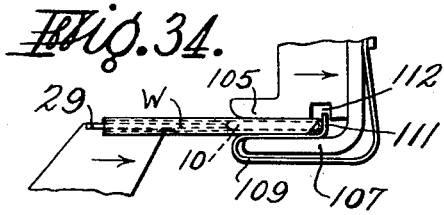
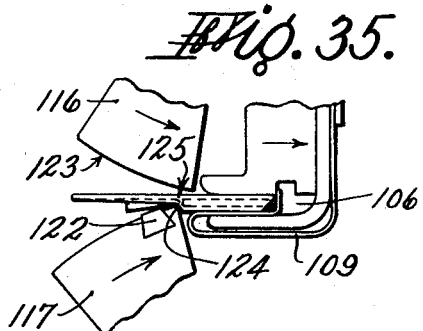
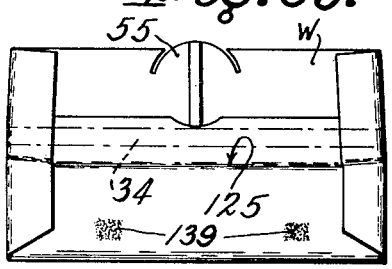
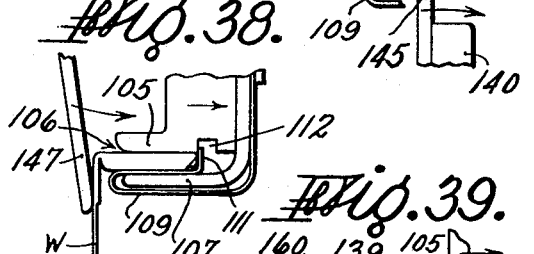
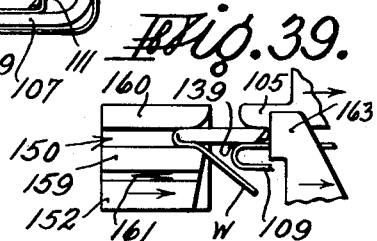
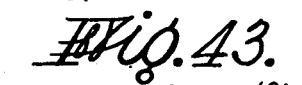
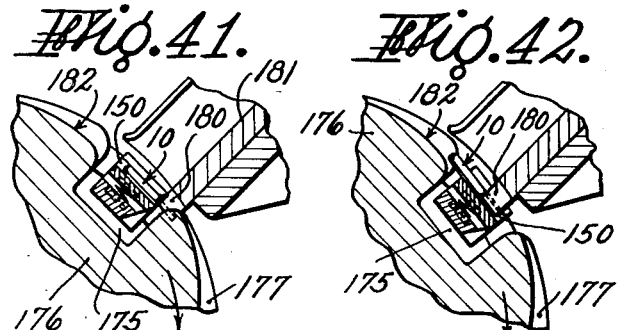
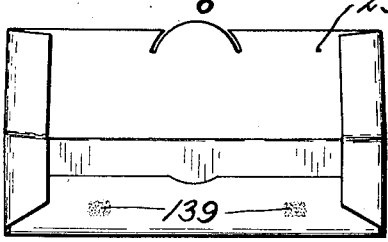
INVENTORS
EDWARD F. CORNOCK AND
BY FRANKLIN B. ROBERTS
Chapin & Neal
ATTORNEYS Patented Feb. 6, 1951

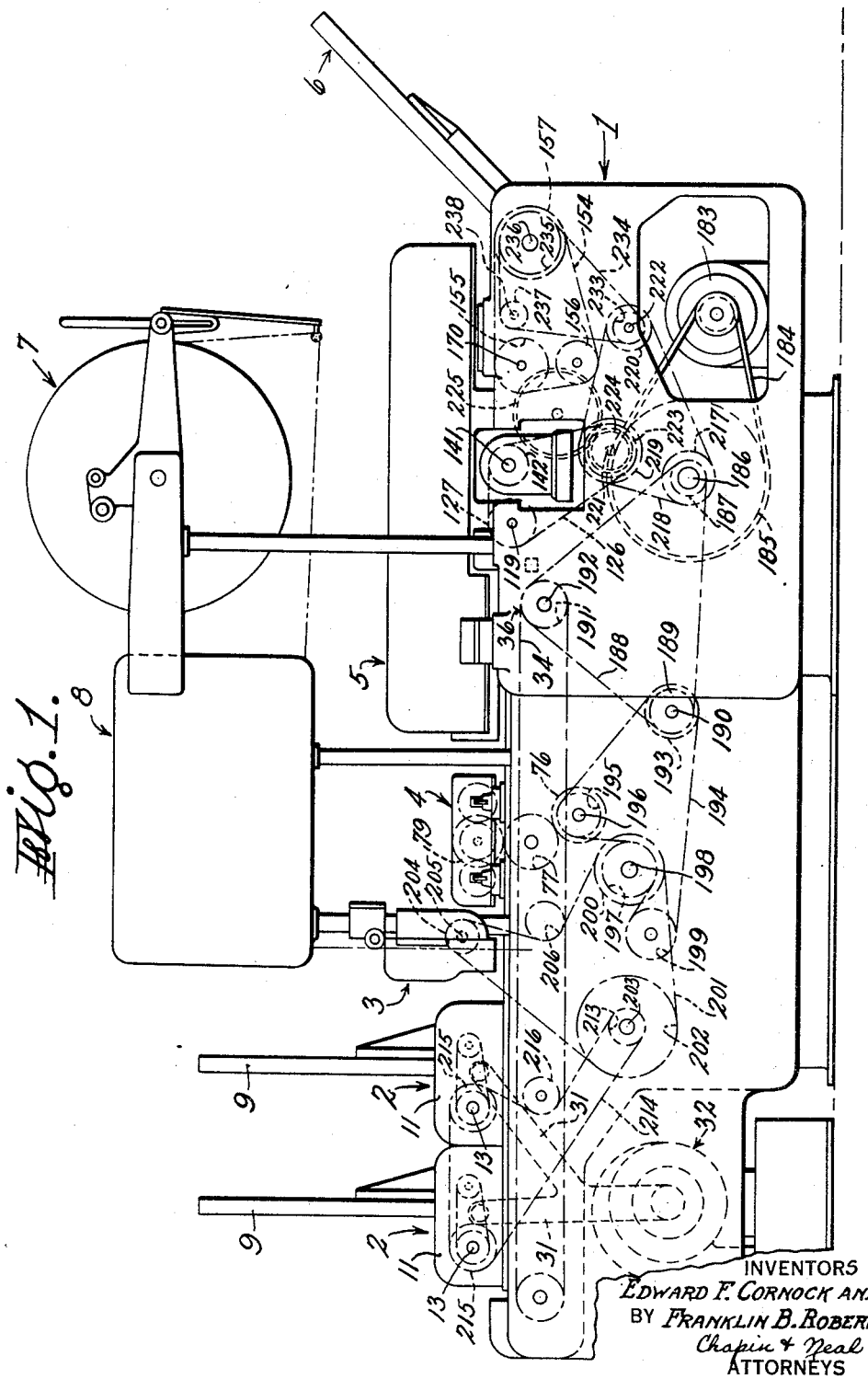

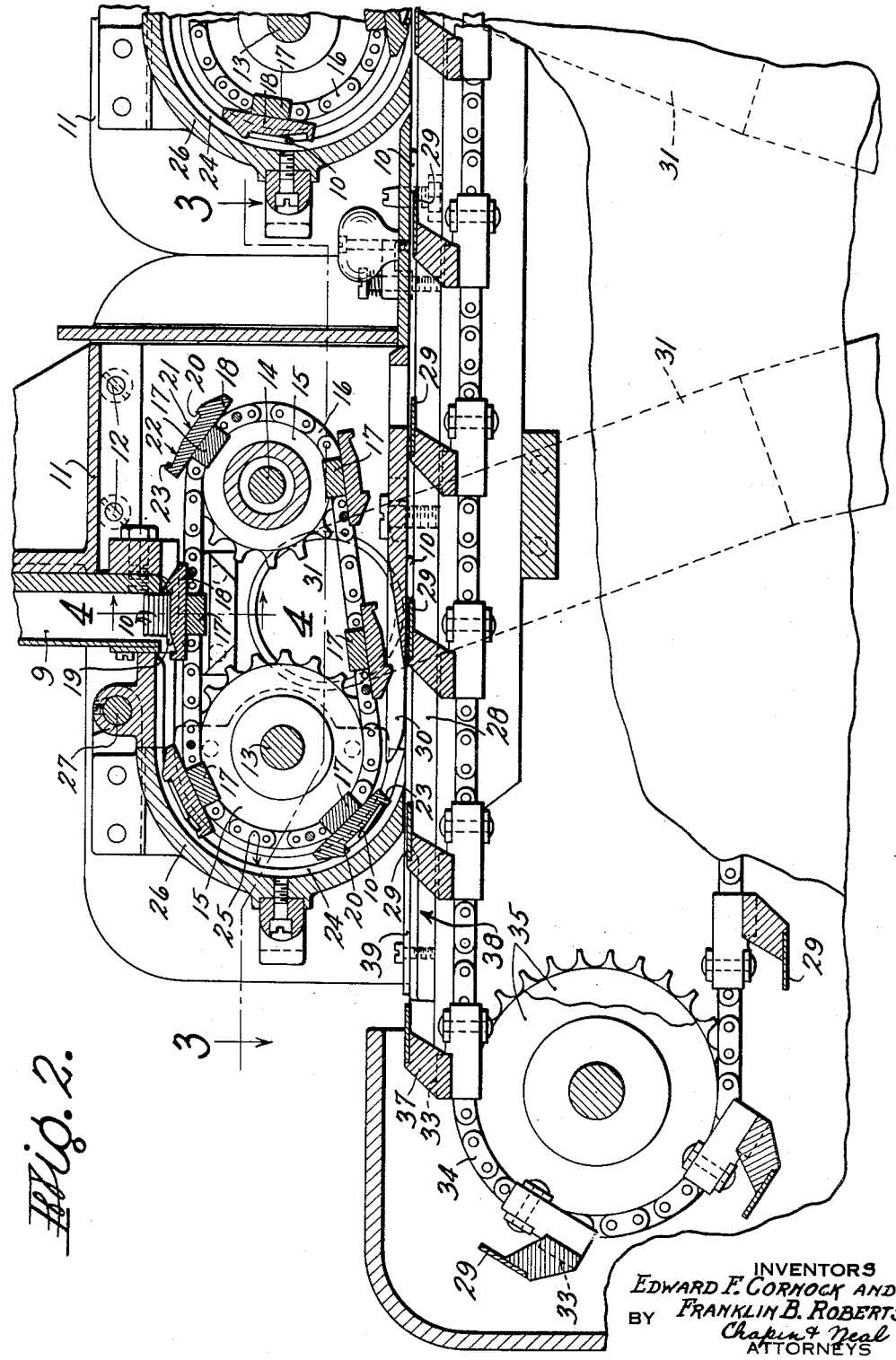

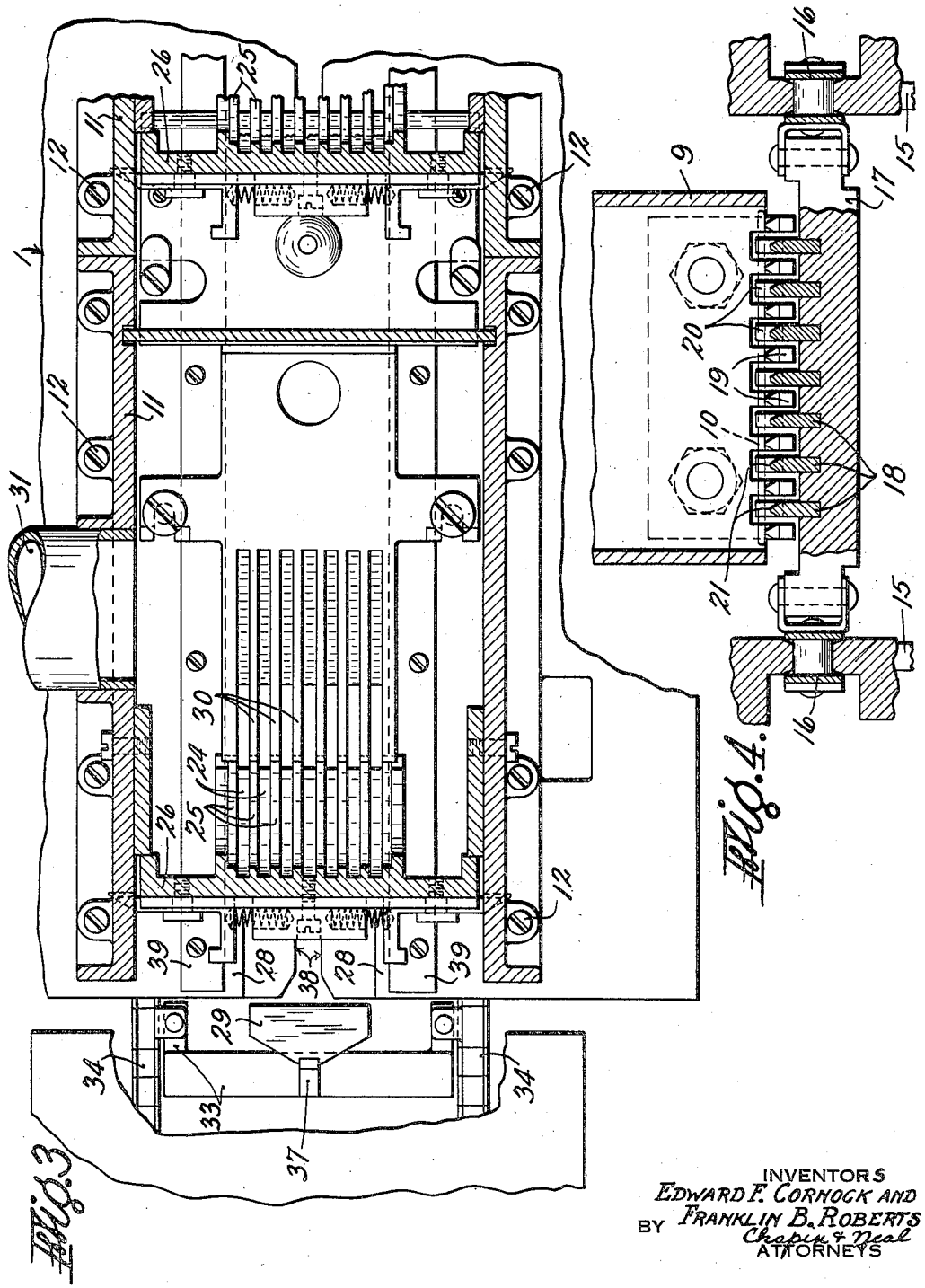

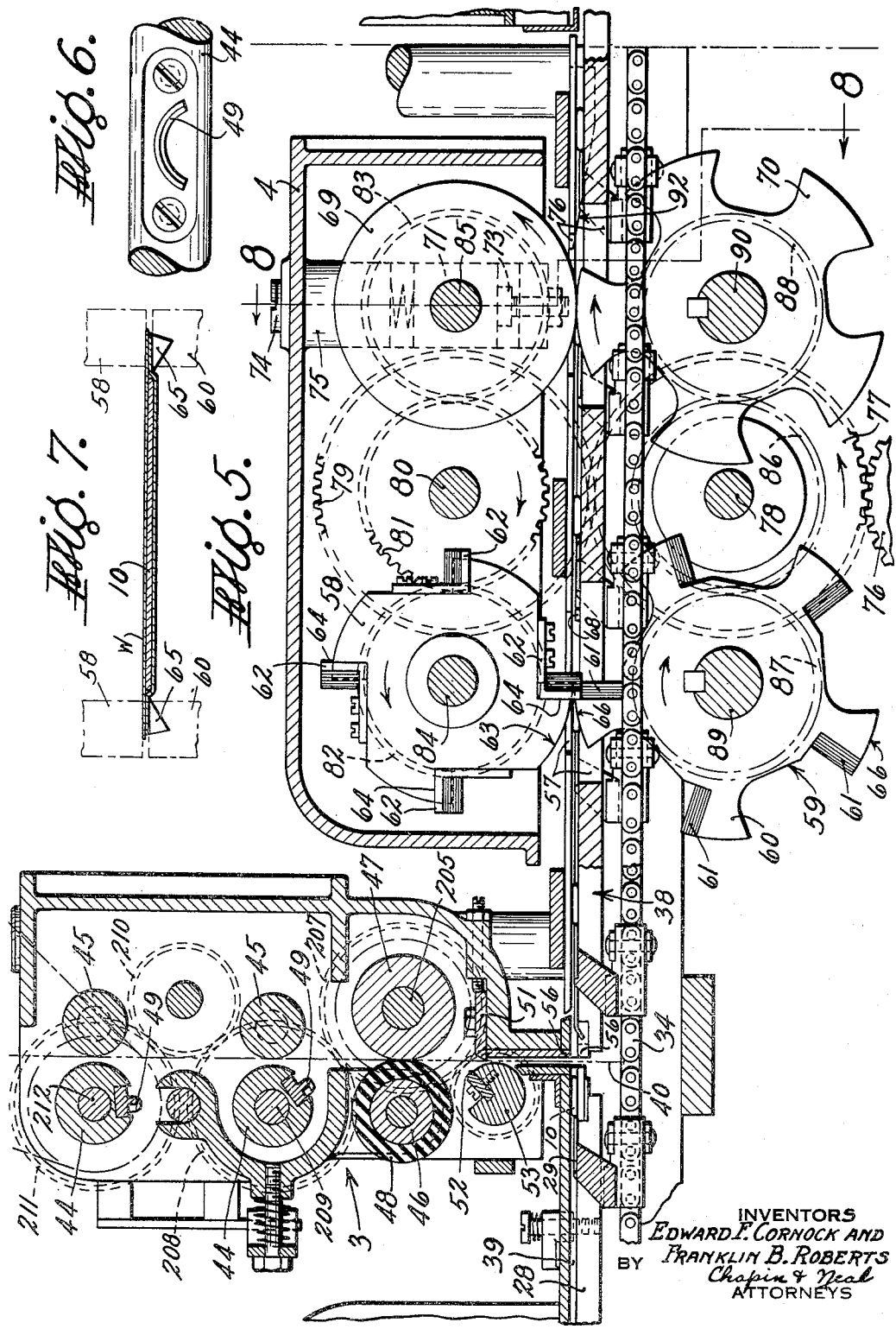

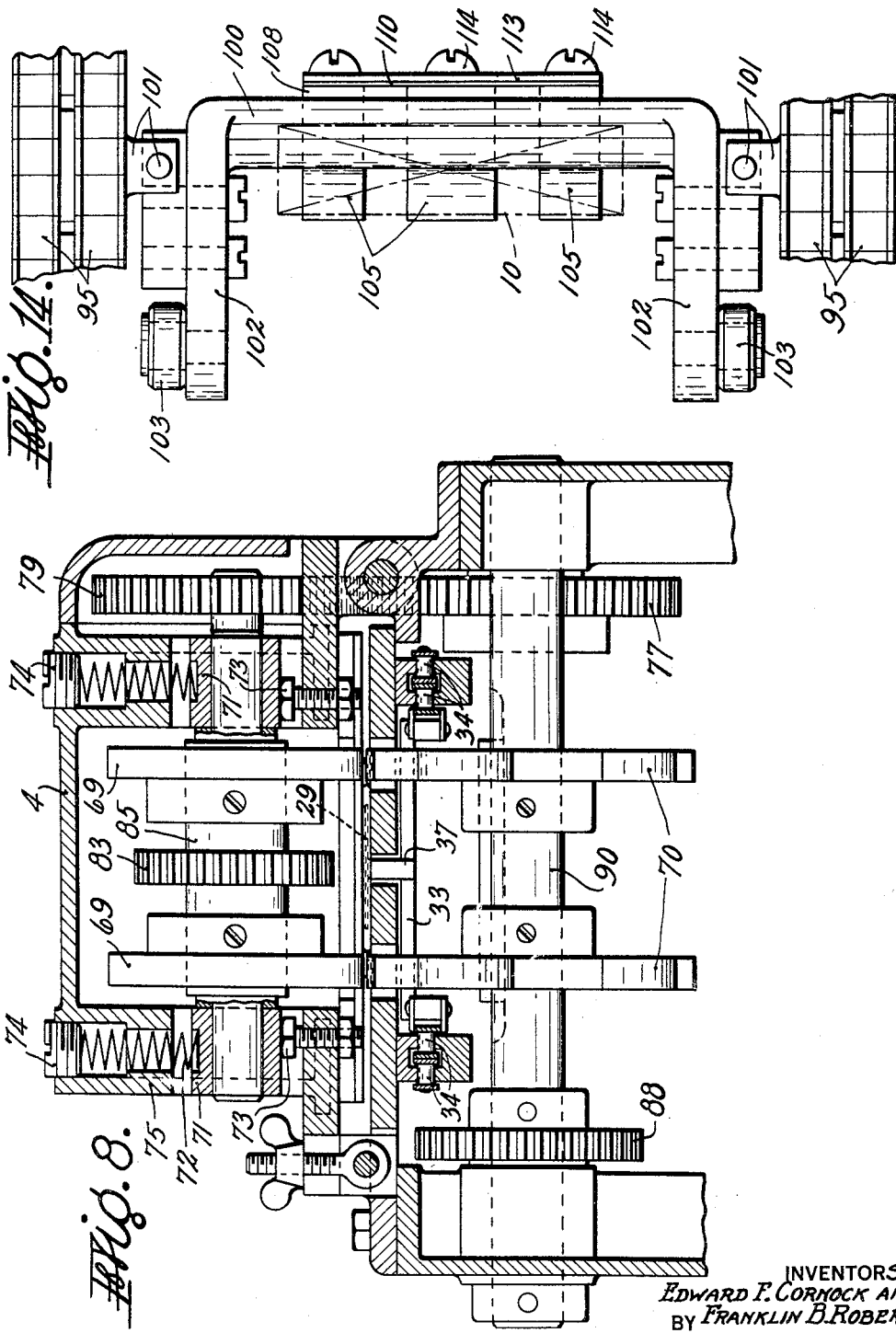

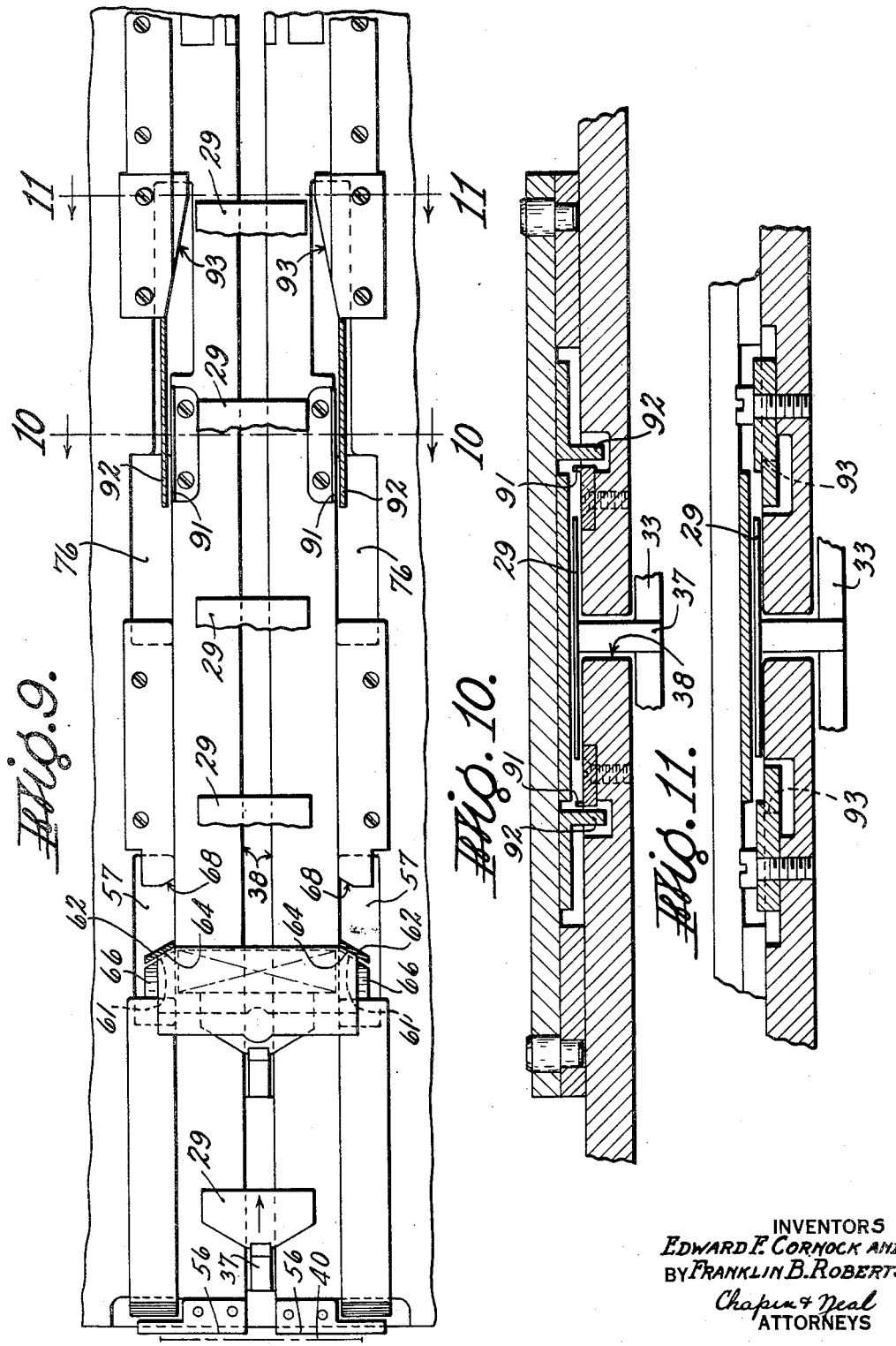

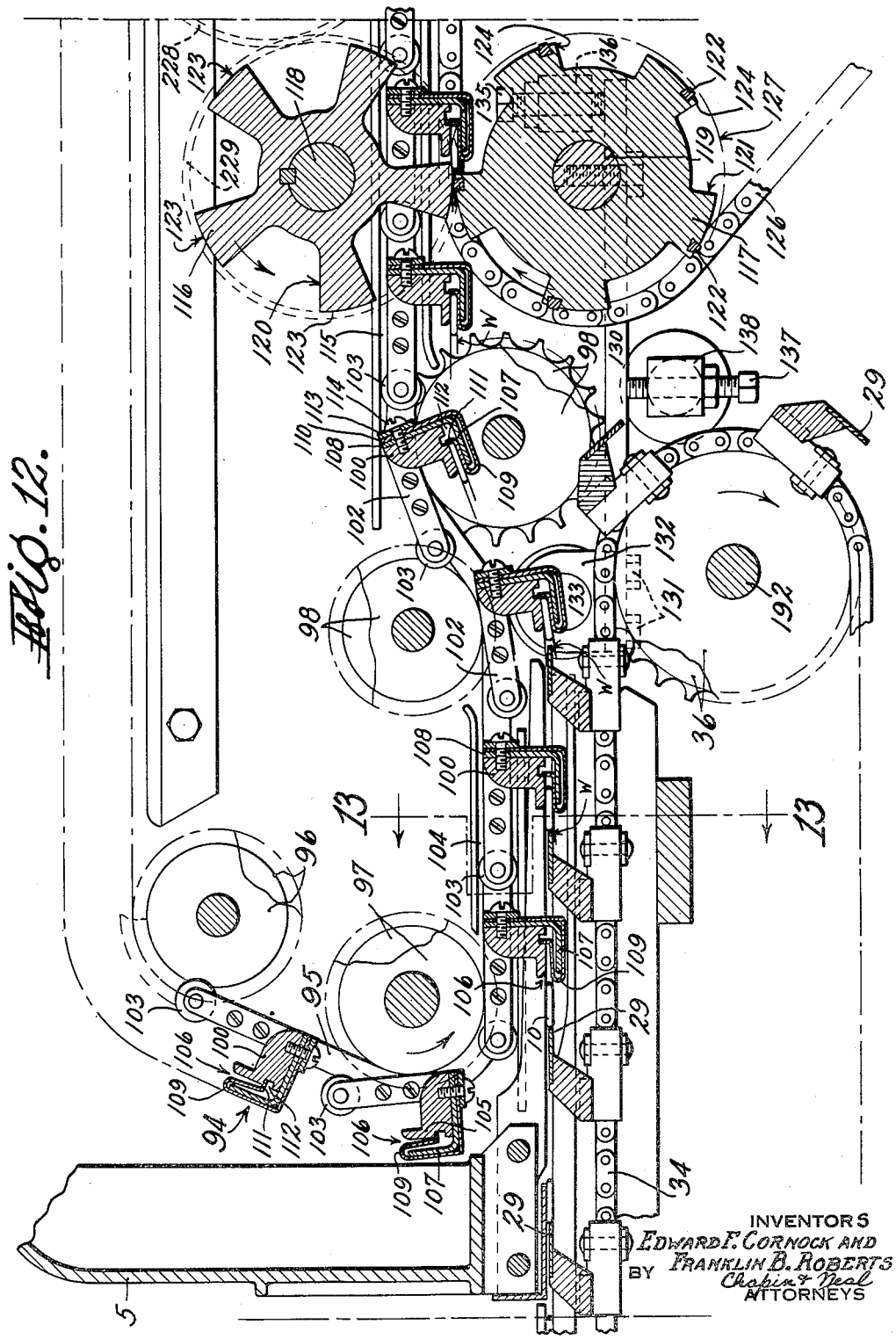

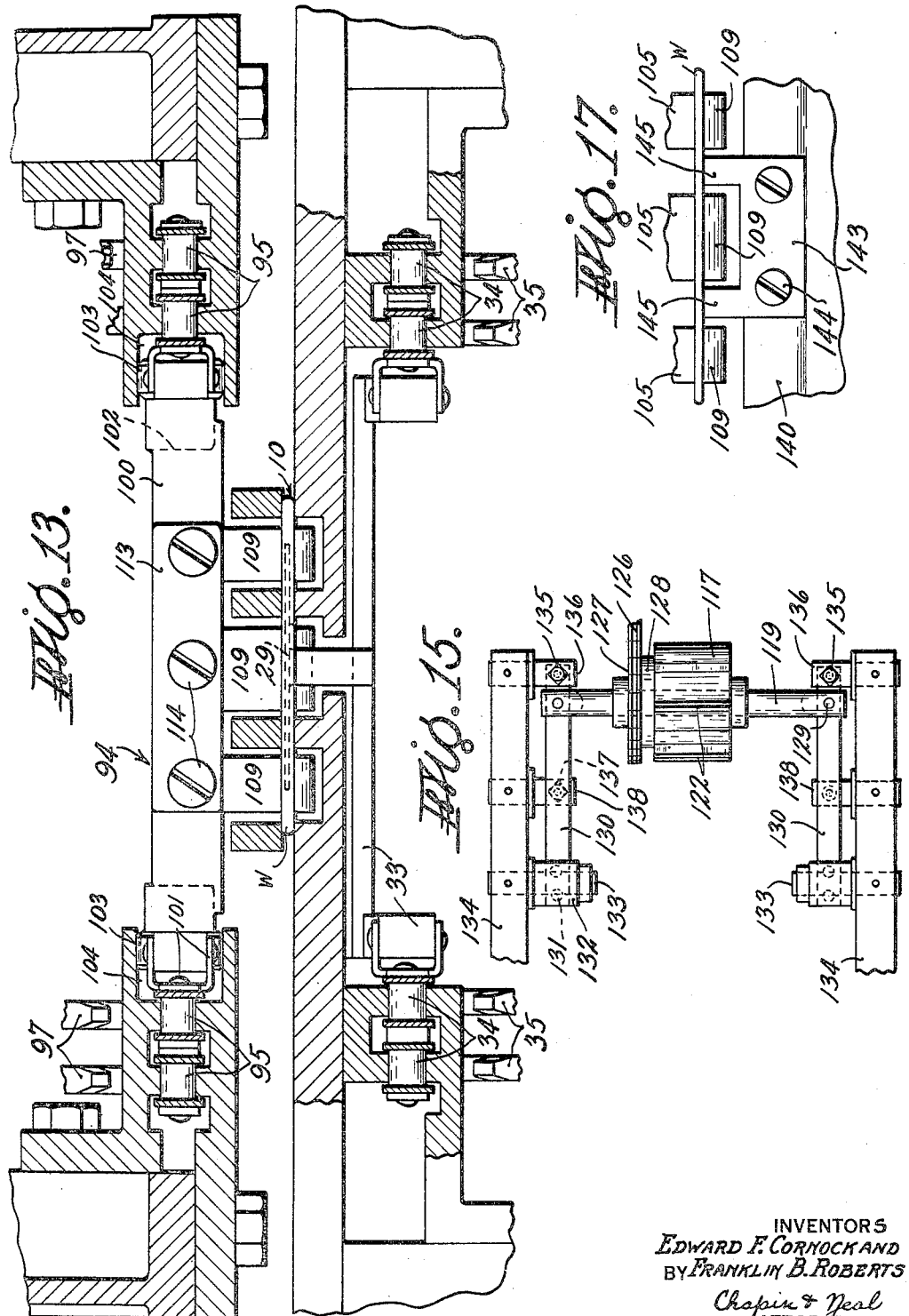

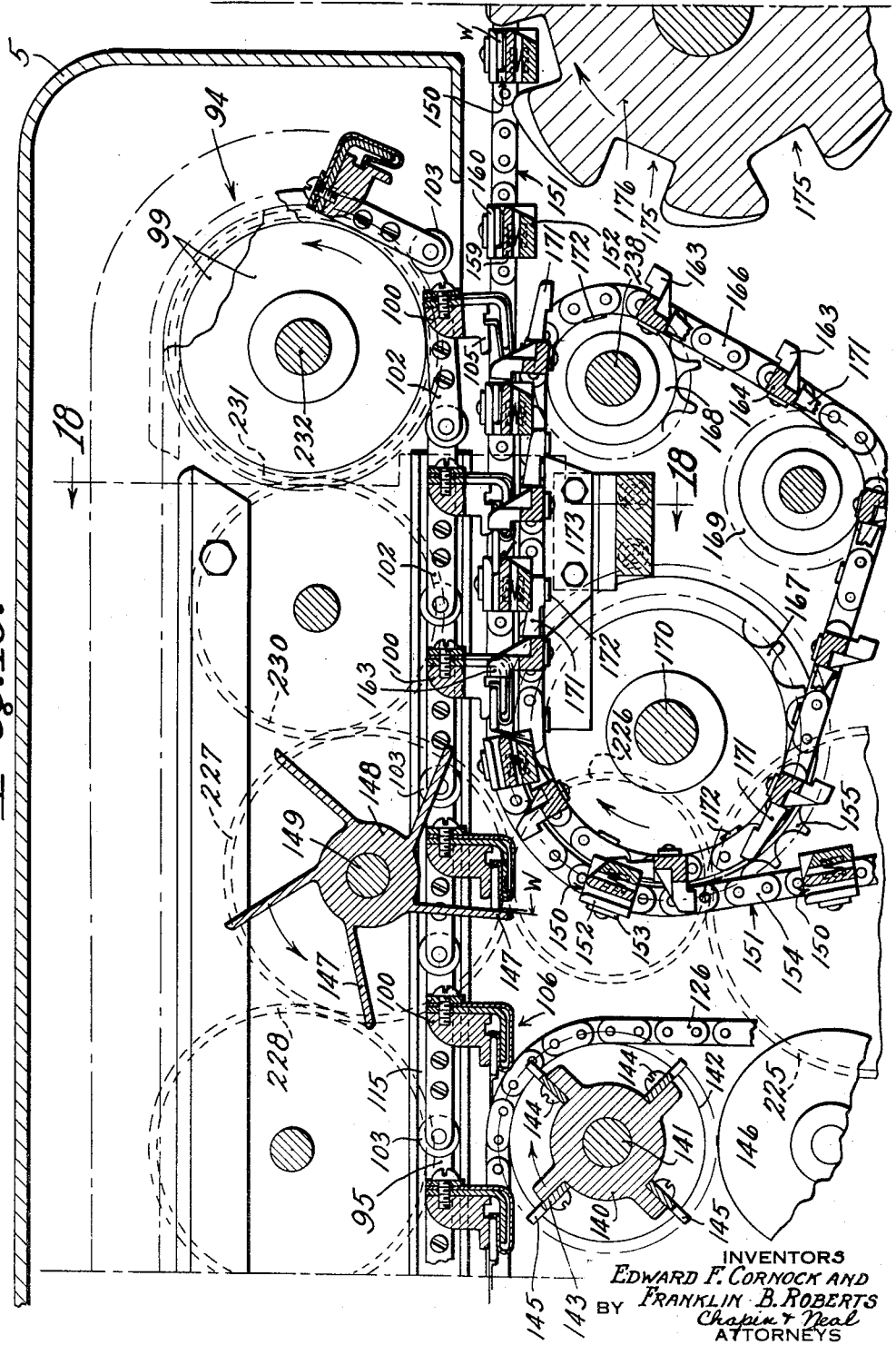

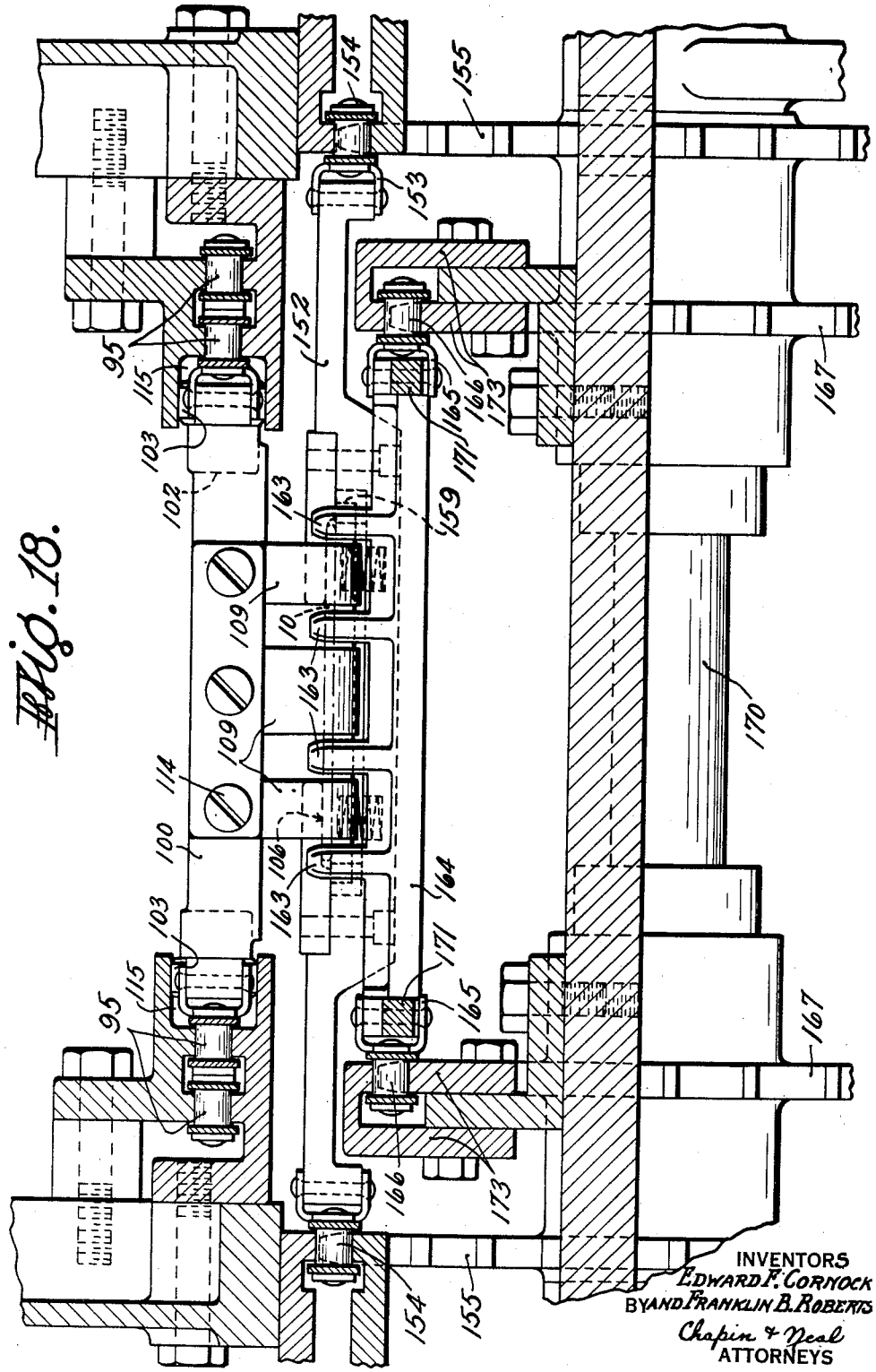

2,540,430

UNITED STATES PATENT OFFICE 2,540,430

GUM WRAPPING MACHINE

Edward F. Cornock and Franklin B. Roberts, Springfield, Mass., assignors to Package Machinery Company, East Longmeadow, Mass., a corporation of Massachusetts Application July 17, 1948, Serial No. 39,366

16 Claims. (Cl. 93—2)

This invention relates to a machine for wrapping individual sticks of gum.

One object of the invention is to provide a machine capable of accurate folding of the wrapper to form, as later described, a completely sealed package and at the same time operate at high speed.

A further object is to provide continuously traveling means for imparting a continuous forward advance to the article and wrapper through the folding instrumentalities, but at varying rates of speed, and to provide wrapping mechanisms capable of operating with such advancing means.

Other and further objects relating to details of construction and operation contributing to the above result will be made apparent in the following specification and claims.

In the accompanying drawings:

Fig. 1 is a side elevational view of a machine embodying the invention;

Fig. 2 is a longitudinal vertical sectional view on a larger scale showing one of the two gum feeding devices;

Fig. 3 is a sectional view substantially on line 3—3 of Fig. 2;

Fig. 4 is a detail sectional view substantially on line 4—4 of Fig. 2;

Fig. 5 is a longitudinal vertical sectional view of the wrapper feed and initial folding instrumentalities;

Fig. 6 is a detail view showing the face of a cutting member;

Fig. 7 is a diagrammatic view showing the relation of certain folders in one of the wrapper folding steps;

Fig. 8 is a sectional view substantially on line 8—8 of Fig. 5;

Fig. 9 is a plan view with the superstructure removed of a portion of the bed of the machine generally corresponding to the portion shown in Fig. 5;

Figs. 10 and 11 are detail sectional views on an enlarged scale substantially on lines 10—10 and 11—11 respectively of Fig. 9;

Fig. 12 is a longitudinal vertical section view showing the manner of transferring the partially wrapped gum sticks from one conveyor to another;

Fig. 13 is a sectional view substantially on line 13—13 of Fig. 12;

Fig. 14 is a top plan detail view of one of the carriers of the second conveyor;

Fig. 15 is a top plan detail view of the seam pressing roll and its mounting;

Fig. 16 is a longitudinal section view showing the mechanism for transferring the gum sticks from the second conveyor to the discharge conveyor;

Fig. 17 is a detail view of the adhesive applying means;

Fig. 18 is a sectional view substantially on line 18—18 of Fig. 16;

Fig. 19 is a fragmentary vertical section through the discharge mechanism and article receiving chute;

Figs. 20 and 21 are sectional detail views substantially on lines 20—20 and 21—21 respectively of Fig. 19;

Fig. 22 is an elevational view of a fragment of the combined wrapper and tearing strip web just prior to the cutting therefrom of a wrapper;

Figs. 23 to 40 inclusive are detail diagrammatic views showing the successive folding operations;

Figs. 41, 42 and 43 are diagrammatic views showing the manner of discharging the wrapped gum sticks from the third conveyor to the article receiving chute; and Fig. 44 is a detail view showing an alternative form of package.

Referring to Fig. 1 of the drawings, the operative members are shown supported by a machine frame structure generally indicated at 1. Supported on the frame 1 are a pair of gum feed devices generally indicated at 2, a wrapper feeding mechanism at 3, housings 4 and 5 enclosing certain wrapping instrumentalities and an article receiving chute generally indicated at 6, all of which mechanisms and instrumentalities will later be fully described. Generally indicated at 7 is a wrapper web supply and at 8 a housing enclosing means for assembling a tearing strip with the web and applying a suitable pressure sensitive adhesive, such as wax, to the assembled web and strip. Since the specific form of these devices are not essential parts of the present invention, further disclosure or description thereof is not deemed necessary.

The construction of the first of the gum feeding devices is shown in Figs. 2 and 3; the second gum feeding device being exactly similar, the description of one will suffice for both. As there shown a vertical magazine 9 for the gum sticks 10 is supported by a housing 11 mounted by means of screws 12 to the frame 1. Within the housing are journaled a pair of shafts 13 and 14 each carrying spaced sprockets 15 about which engage sprocket chains 16. Extending between and carried by the chains 16 (Figs. 2 and 4) are a plurality of bars 17, each of which is provided with a gum stick carrier made up of a plurality of rib wrapper are sealed together, the pressure of rolls 69 and 70 being adjusted to the needs of the particular adhesive employed.

As shown in Figs. 5 and 8 the rolls 58—59 and 69—70 are driven from a gear 76 which meshes with a gear 77 secured on a shaft 78. Gear 77 drives a gear 79 secured to an idler shaft 80 to which is secured a second gear 81. Gear 81 meshes with gears 82 and 83 respectively carried by shaft 84 of rolls 58 and shaft 85 of rolls 69. Shaft 78 carries a second gear 86 which meshes with gears 87 and 88 respectively carried by shaft 89 of rolls 59 and shaft 90 of rolls 70. Gear 76 receives power from the main drive of the machine as later described.

As in the case of surfaces 63 and 66 of rolls 58 and 59, the surfaces of rolls 69 and 70 make a rolling contact with the wrapper end extensions substantially in the plane of the upper surface of the gum stick. As the articles reenter the wrapping channel the underside of the end extensions of the wrapper are engaged by end creasers 91 (Figs. 9 and 29) which hold the wrapper against the end of the gum stick and assure a clean "break" of the wrapper substantially in the plane of the upper surface of the latter as the upper surface of the end extensions are engaged by stationary folders 92 (Figs. 9, 10, 30 and 31) which fold the end extensions downwardly over creasers 91 into position to be engaged by stationary folders 93 which turn the downwardly extending wrapper ends inwardly and upwardly against the underside of the partially wrapped gum and trailing portions of the wrapper, as shown in Figs. 32 and 33.

Up to this stage of the wrapping operation the pushers have maintained their engagement with the trailing edges of the gum sticks and the pushers are partially enclosed within the wrapper which has now been folded over the upper and lower faces, the forward edge face and the end faces of the gum stick. As shown in Figs. 12, 14 and 16 the so partially wrapped gum sticks are transferred to a second conveyor generally indicated at 94.

Conveyor 94 comprises spaced double sprocket chains 95 which travel around rear sprockets 96 and 97, upper and lower intermediate sprockets 98 (Fig. 12), and forward sprockets 99 (Fig. 16). Cross members 100 are rigidly connected at their ends to a link of the chains as at 101, Figs. 13 and 14 and are formed with rearwardly extending arms 102 carrying guide rolls 103 traveling in guide channels 104 after rounding sprockets 97. Each cross member 100 is formed with downwardly and rearwardly extending projections 105 which form the upper members of article receiving pockets generally indicated at 106. The lower pocket members are formed by rearwardly directed angular fingers 107 extending from a bar 108 secured to the forward face of each cross member 100 and spring fingers 109 extending from a bar 110. The free ends of fingers 109 are bent upwardly and forwardly over the ends of member 107 and terminate in projections 111 engaging in recesses 112 in cross members 100. The bar portions 108 and 110 are secured to the cross members by a bar 113 and screws 114.

As cross members 100 round the sprocket 97 the pocket members 106 swing into interproximal relation with the pushers 29 and the partially wrapped gum sticks being advanced thereby. The rolls 103 which travel in guideways 104 maintain the pockets in the plane of the gum sticks. Conveyor 94 travels at a slower speed than the conveyor 34 and as the pockets 106 are overtaken by the pushers 29 the pushers introduce the partially wrapped gum sticks into the pockets and against the projections 111 as best shown in Fig. 12. The spring fingers 109 yield as the gum sticks are introduced into the pockets as shown in Fig. 34, but return to a position with projections 111 engaging the trailing wall of recesses 112, Fig. 35, when the pushers withdraw thus accurately positioning the articles in the pockets. As the transfer of the gum stick to the pocket is completed the chains 95 and the pockets 106 carried thereby turn upwardly around sprockets 98. The chains 95 are driven at a uniform rate but because of the projection of the pockets from the chain a relative increase in the speed of the pockets takes place as the pockets swing upwardly in an arc around the sprockets 98. As a result of this temporary increase in the speed of the pockets the trailing wrapper portions are drawn clear of the pushers 29 which then turn downwardly around the sprockets 36 without possibility of damage to the trailing wrapper. Immediately after the conveyor 94 passes over the sprockets 98 rolls 103 enter a second pair of guideways 115 which again maintain the pockets in a horizontal plane. While the pockets are so held the members 100 pass between presser rolls 116 and 117, carried on shafts 118 and 119 respectively, and extending transversely of the path of travel of the articles. Rolls 116 and 117 are cut away at 120 and 121 to permit the passage between them of the members 100 and pockets 106. The surface of roll 117 is provided with pressure ribs 122 formed of hard fiber or the like which engage and press the trailing wrapper extensions against the surfaces 123 of roll 116. The leading edges 124 of the rib-carrying portions of roll 117 crease the wrapper upwardly over the trailing edge surface of the gum stick, as best shown at 125 in Figs. 35 and 36, in advance of the application of pressure by the ribs 122. The ribs are positioned to engage the wrapper opposite the transverse portions of the printed adhesive 43 which portions are positioned opposite each other on the adjacent inner faces of the wrapper. Thus in the presence of the adhesive 43 the sealing of the wrapper is completed.

As shown in Figs. 12 and 15 the lower presser roll 117 is rotatably mounted on its shaft 119 and is driven by a chain 126 passing around a sprocket 127 secured to a hub 128 extending from one end of the roll. The ends of shaft 119 are bolted at 129 to spring arms 130 secured by bolts 131 to blocks 132 mounted on lugs 133 extending from machine frame members 134. The upper faces of spring arms 130 adjacent their free ends and forwardly of shaft 119 are engaged by stop screws 135 adjustably threaded in lugs 136 extending from frame members 134. The under surfaces of arms 130 are similarly engaged intermediate blocks 132 and shaft 119 by stop screws 137 adjustably threaded in lugs 138 extending from frame members 134. As will be apparent by adjusting screws 135 and 137 the pressure exerted between ribs 122 and surfaces 123 may be adjusted.

Beyond the presser rolls 116 and 117 the partially wrapped gum sticks are carried over a rotary, adhesive applying device which applies spaced spots of adhesive 139 (Fig. 36) to the face of the under portion of the wrapper. The adhesive applying device as best shown in Figs. 16, 17 and 37 comprises a rotary member 140 secured

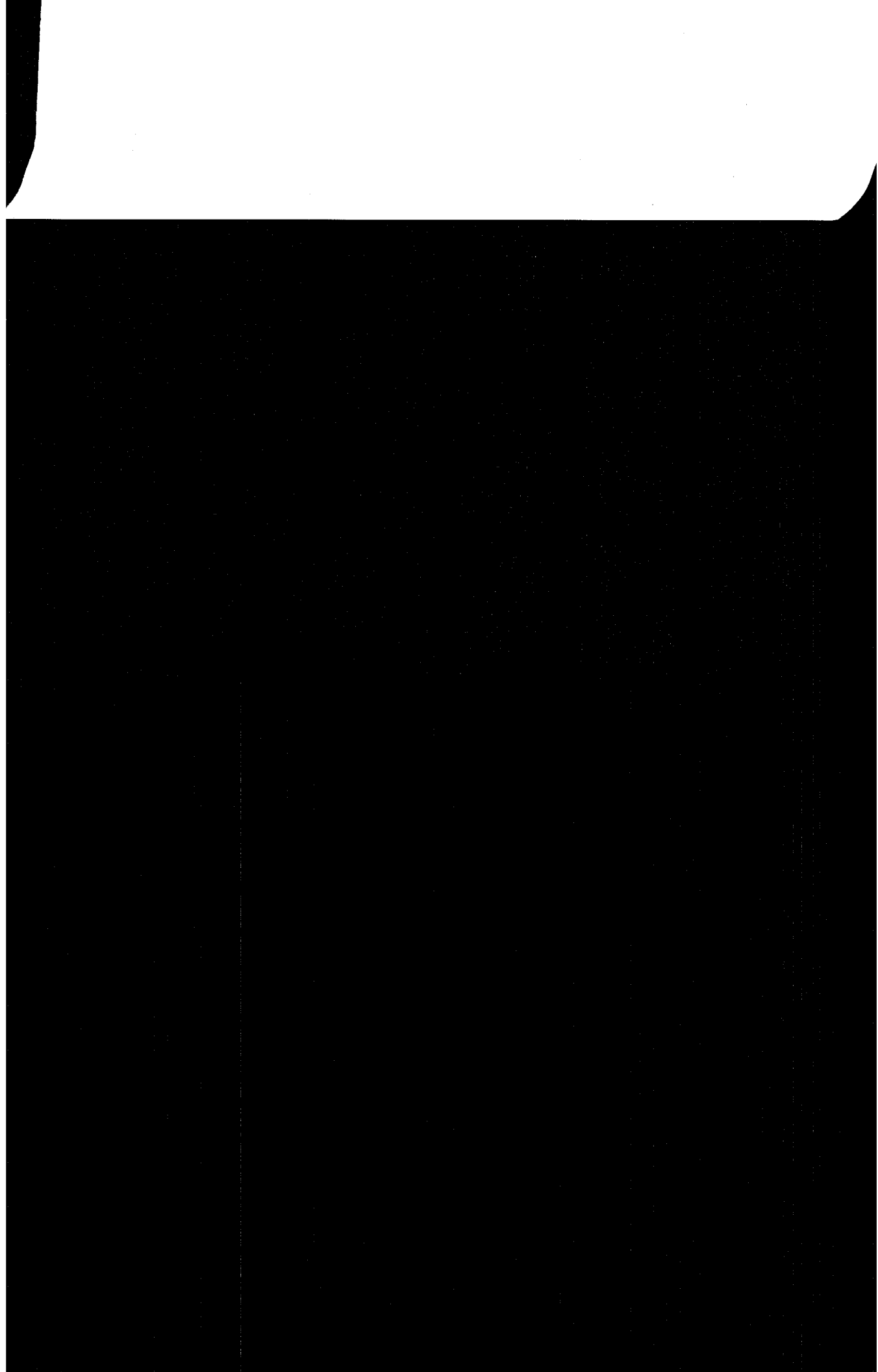

Conveyor 151, transfer fingers 163 on chains 166, and discharge drum 176 are driven from the jack shaft 222 (Fig. 1) which carries a second sprocket 233 driving a chain 234. The latter passes around a sprocket 235 on shaft 236, on which discharge drum 176 and sprockets 157 of the conveyor 151 are mounted, and around a sprocket 237 secured on shaft 238 to which sprockets 168 of transfer conveyor 166 are secured (Fig. 16).

As will be apparent the gum sticks advance continuously through the machine and that at the time the gum sticks are transferred from the pushers to pockets 106, and from the pockets 106 to pockets 150 by the transfer fingers 163 the pusher, pockets and fingers all maintain a continuous, individual uniform movement in the same direction, the transfer being effected by the relative speed of the members.

While the machine is particularly adapted to the application of a wrapper having a printed pressure sensitive adhesive border by which a completely sealed package is obtained, an unprinted short wrapper, such as shown at 238 in Fig. 44, may be used if desired, the spots of adhesive 139 supplied by the machine itself being the only adhesive used.

What we claim is:

1. In a wrapping machine, a continuously traveling pusher for advancing an article edgewise against a wrapper to fold the latter transversely about the forward edge of the article with a portion of the wrapper trailing the article in overlapping relation with the pusher, a conveyor traveling at a uniform speed less than the speed of the pusher, an article receiving pocket extending from the conveyor and moving for a portion of its travel in alignment with and in advance of the pusher, to receive the partially wrapped article from the pusher, and means to change the direction of travel of the conveyor to swing the pocket in an arc to thereby temporarily increase its speed relative to the pusher and free the trailing wrapper portion from the pusher.

2. In a wrapping machine, a continuously traveling conveyor for advancing an article edgewise against a wrapper to fold the latter transversely about the forward edge of the article with portions of the wrapper extending sidewise from the ends and rearwardly from the rear edge of the article, means to fold the sidewise extending portions of the wrapper over the ends of the article, a second continuously traveling conveyor having an article receiving pocket into which the partially wrapped article is delivered by the first conveyor, means to fold a rearwardly extending portion of the wrapper against the rear edge of the article, means to fold the trailing portion of the wrapper at right angles to the plane of the article, a third continuously traveling conveyor having an article receiving pocket opening forwardly and rearwardly, means to transfer the article rearwardly from the pocket of the second conveyor into the pocket of the third conveyor through its forward opening to complete the wrapping of the article and means to eject the article from the pocket of the third conveyor through its rearward opening.

3. In a wrapping machine, an article advancing conveyor carrying a forwardly extending cantilever pusher, means to deliver an article into position to be advanced by the pusher, means to feed a wrapper across the path of travel of the pusher, a wrapper channel having stationary upper and lower members to fold the upper and lower portions of the wrapper rearwardly over the upper and lower faces of the article and adjacent portions of the pusher with portions of the wrapper extending outwardly from the ends of the article, means positioned at the sides of the folding channel to fold the leading corners of the end extensions of the wrapper at right angles to and then rearwardly against the end extensions, and means to fold said extensions and so folded corners against one face of the article, a traveling pocket into which the partially wrapped article is inserted by the pusher, means to fold the trailing portion of the wrapper at right angles to the article and means to discharge the article from the traveling pocket and simultaneously fold the trailing portion of the wrapper onto a face of the article.

4. In a wrapping machine having means for advancing an article and its wrapper into a wrapping channel to initially fold the wrapper over the forward and upper and lower faces of the article with portions of the wrapper extending endwise from said faces, pairs of rolls positioned in the path of advance of the extending end portions of the wrapper, said rolls having spaced peripheral portions making a rolling engagement with the end extensions of the wrapper in the plane of one of the two last-named faces of the article to fold the end portions of the wrapper which extend from the opposite face against the ends of the article, one roll of each pair having a projection engaging the forward corner portion of the adjacent end extension of the wrapper to fold the latter over the leading edge of the peripheral portion of the opposite roll at substantially a right angle to the plane of the end extension of the wrapper.

5. In a wrapping machine having means for advancing an article edgewise against a wrapper to initially fold the wrapper over the forward and upper and lower faces of the article with portions of the wrapper extending endwise from said faces, pairs of rolls positioned in the path of advance of the extending end portions of the wrapper, said rolls having spaced peripheral portions making a rolling engagement with the end extensions of the wrapper in the plane of one of the two last-named faces of the article to fold the end portions of the wrapper which extend from the opposite face against the ends of the article, one roll of each pair having a projection engaging the forward corner portion of the adjacent end extension of the wrapper to fold the latter over the leading edge of the peripheral portion of the opposite roll at substantially a right angle to the plane of the end extension of the wrapper, means for folding the said corner portions rearwardly against the end extensions of the wrapper, and pairs of spring pressed rolls engaging the so folded end extensions of the wrapper to seal the extending end portions of the wrapper together in the presence of pressure sealing material on the adjacent faces of the engaged portions of the wrapper.

6. In a wrapping machine having means for advancing an article edgewise against a wrapper to initially fold the wrapper over the forward and upper and lower faces of the article with portions of the wrapper extending endwise from said faces, pairs of rolls positioned in the path of advance of the extending end portions of the wrapper, said rolls having spaced peripheral portions making a rolling engagement with the end extensions of the wrapper in the plane of one of the two ets and traveling in a path in part coinciding with the rectilinear portion of the path of travel of said first conveyor, the pockets of the first conveyor traveling in interproximal relation with the pockets of the second conveyor through the coinciding portions of their paths of travel, means to continuously drive said conveyors, a third conveyor carrying spaced ejector fingers and traveling in a path in part coinciding with the coinciding portions of the paths of travel of the first and second conveyors, the ejector fingers entering said coinciding portions in interproximal relation with the pockets of the first two conveyors and leading the pockets of the first conveyor, said fingers being in alignment with the spaces between the transversely spaced members of the pockets on the first conveyor, and means to drive said third conveyor continuously and at a speed less than the speed of the first two conveyors to cause the bridging portions of the articles in the pockets of the first conveyor to be engaged by said fingers and transferred thereby to the adjacent following pocket of the second conveyor.

13. In a wrapping machine, a continuously traveling endless conveyor, spaced pockets carried by said conveyor and traveling in a path in part rectilinear for advancing an article and its wrapper, with a portion of the wrapper extending outwardly of the pocket, said pockets each including transversely spaced members, the space between said members being bridged by the article in the pocket, a second continuously traveling endless conveyor carrying spaced pockets in a path in part coinciding with the rectilinear path of travel of the pockets of the first conveyor, the pockets of said two conveyors advancing in interproximal relation through the coinciding portions of their travel, and means engaging the said briding portion of the articles in the pockets of the first conveyor to transfer them to the following pocket of the second conveyor, as said pockets advance in interproximal relation, to fold the extending portion of the wrapper against a face of the article.

14. In a wrapping machine, a continuously traveling endless conveyor, spaced members carried by said conveyor and traveling in a path in part rectilinear for advancing articles and their wrappers through wrapping instrumentalities of the machine, a second continuously traveling endless conveyor carrying spaced pockets in a path in part coinciding with the rectilinear path of travel of the article advancing members of the first conveyor, said members and pockets advancing in interproximal relation through the coinciding portions of their travel, the pockets of the second conveyor opening forwardly and rearwardly, means to transfer the partially wrapped articles from the article advancing members of the first conveyor to the adjacent following pockets of the second conveyor through the forward openings of said pockets to complete the wrapping of the articles, a drum about which the second conveyor travels, said drum being formed with spaced grooves in which said pockets mesh, and a stationary member engaging the leading edge of the articles to discharge them from the pockets through the rear pocket opening and onto the surface of the drum between the grooves, said surface being inclined to move the discharged article thereon radially outward of the drum and free of the conveyor.

15. In a wrapping machine, an endless conveyor carrying spaced pockets having forward and rearward openings, means to move partially wrapped articles into said pockets through the forward openings thereof to complete the wrapping of the articles, a drum about which the conveyor travels, said drum being formed with spaced grooves in which said pockets mesh, and a stationary member engaging the leading edge of the articles to discharge them from the pockets through the rear pocket opening and onto the surface of the drum between the grooves, said surface being inclined to move the discharged article thereon radially outward of the drum and free of the conveyor.

16. In a wrapping machine, a plurality of successive, continuously traveling, endless conveyors, each conveyor carrying spaced means for continuously advancing an article and its wrapper through successive wrapping instrumentalities of the machine, the end portions of adjacent conveyors overlapping, and the article advancing means of the adjacent conveyors being positioned thereon to move in interproximal relation with each other through the overlapping portions of the travel of the conveyors to permit transfer of the articles and their wrappers between adjacent article advancing means while traveling in said relation.

EDWARD F. CORNOCK.
FRANKLIN B. ROBERTS.

REFERENCES CITED

The following references are of record in the file of this patent:

UNITED STATES PATENTS

| Number | Name | Date |
| --- | --- | --- |
| 1,572,256 | Van Buren | Feb. 9, 1926 |
| 2,486,892 | Sumida | June 27, 1946 |